(12) United States Patent
Xu et al.

(10) Patent No.: US 9,310,918 B2
(45) Date of Patent: Apr. 12, 2016

(54) TOUCH DISPLAY HAVING A REFLECTIVE TYPE DISPLAY SCREEN

(75) Inventors: Qing Xu, Beijing (CN); Xiangtao Liu, Beijing (CN)

(73) Assignees: Beijing Lenovo Software Ltd. (CN); Lenovo (Beijing) Limited (CN)

( * ) Notice: Subject to any disclaimer, the term of this patent is extended or adjusted under 35 U.S.C. 154(b) by 194 days.

(21) Appl. No.: 13/976,678

(22) PCT Filed: Dec. 27, 2011

(86) PCT No.: PCT/CN2011/084739
§ 371 (c)(1),
(2), (4) Date: Jun. 27, 2013

(87) PCT Pub. No.: WO2012/089104
PCT Pub. Date: Jul. 5, 2012

(65) Prior Publication Data
US 2013/0285981 A1 Oct. 31, 2013

(30) Foreign Application Priority Data
Dec. 29, 2010 (CN) .......................... 2010 1 0622870

(51) Int. Cl.
*G06F 3/045* (2006.01)
*G06F 3/041* (2006.01)
(52) U.S. Cl.
CPC .................................. *G06F 3/0412* (2013.01)
(58) Field of Classification Search
CPC ....................................................... G06F 3/0412
USPC ....................................................... 345/174
See application file for complete search history.

(56) References Cited

U.S. PATENT DOCUMENTS

2005/0140641 A1* 6/2005 Kim et al. ..................... 345/102
2010/0302192 A1* 12/2010 Park et al. ..................... 345/173

(Continued)

FOREIGN PATENT DOCUMENTS

CN        1180296 C     12/2004
CN     101813865 A      8/2010

OTHER PUBLICATIONS

"International Application Serial No. PCT/CN2011/084739, International Search Report mailed Apr. 5, 2012", (w/ English Translation), 4 pgs.

(Continued)

*Primary Examiner* — Kwang-Su Yang
(74) *Attorney, Agent, or Firm* — Schwegman, Lundberg & Woessner, P.A.

(57) ABSTRACT

The present disclosure provides a display module, an electronic device and a control method thereof. The display module may comprise: a covering unit satisfying a first light transmittance, comprising a touch area; a sensing unit satisfying a second light transmittance, comprising a sensing layer, wherein the covering unit is arranged on a first side of the sensing layer, and the sensing layer is configured to sense a touch position of an operator in the touch area when the operator touches the touch area; a reflective type display unit, comprising a display layer and a reflective surface, wherein the display unit is arranged on a second side of the sensing layer, and the display layer and the reflective surface are respectively opposite to the sensing layer. The display unit displays images through the display layer, and a distance between the reflective surface and the sensing unit is larger than or equal to a distance between the display layer and the sensing unit, wherein an incident light arriving at the reflective surface forms a reflected light capable of transmitting through the sensing unit and the covering unit.

2 Claims, 4 Drawing Sheets

(56) References Cited

U.S. PATENT DOCUMENTS

2010/0302193 A1* 12/2010 Park et al. .................... 345/173
2011/0128467 A1* 6/2011 Miyazaki et al. ............... 349/61
2011/0254869 A1 10/2011 Pan et al.

OTHER PUBLICATIONS

"International Application Serial No. PCT/CN2011/084739, Written Opinion mailed Apr. 5, 2012", 7 pgs.

* cited by examiner

TOUCH DISPLAY HAVING A REFLECTIVE TYPE DISPLAY SCREEN

This application is a U.S. National Stage Application filed under 35 U.S.C §371 of International Application Serial No. PCT/CN2011/084739, filed on Dec. 27, 2011 and published as WO 2012/089104 A1 on Jul. 5, 2012 which application claims priority to Chinese Application No. 201010622870.4, filed on Dec. 29, 2010, both of which applications and publication are incorporated herein by reference in their entireties.

TECHNICAL FIELD

The present disclosure generally relates to a technical field of electronic device, and more particularly, to a display module, an electronic device and a control method thereof.

BACKGROUND

Currently, there are various forms of display implementations for a display screen, wherein a pure reflection display technique is widely used due to low power consumption and power saving. The principle of the pure reflection display technique is that light source set by the display screen or external natural light irradiates to a display panel and is reflected into eyes of a user, so that the user may see a picture displayed by the display panel.

Additionally, for convenient use and operations, a touch sensing layer for sensing a touch position of the user on the touch layer may be set under a touch layer of the display screen of various electronic devices such as a mobile phone, a computer, so as to implement a touch operation function. However in the electronic device with the pure reflection screen of the prior art, physical keys are generally used considering transmittance requirements. Currently, there is no display module capable of implementing the touch operation function using the pure reflection display technique yet. Thus, numerous user requirements cannot be satisfied.

SUMMARY

The present disclosure provides a display module, an electronic device and a control method thereof. A touch function may be implemented while a reflective type display screen is used.

One embodiment of the present disclosure provides a display module, comprising:
a covering unit satisfying a first light transmittance, including a first surface and a second surface opposite to each other;
a sensing unit satisfying a second light transmittance, including a first sensing face and a second sensing face opposite to each other, wherein the sensing unit is arranged on a side of the covering unit, and the first sensing face is opposite to the second surface, a first distance between the first sensing face and the first surface being larger than a second distance between the first sensing face and the second surface, and wherein the sensing unit is configured to sense a touch position of an operator in a touch area of the first surface of the covering unit when the operator touches the touch area;
a reflective type display unit arranged on a side of the sensing unit, the display unit comprising a display layer and a reflective surface, wherein the display unit is configured to display images on the display layer, and the display layer and the reflective surface are respectively opposite to the second sensing face, and wherein a distance between the reflective surface and the second sensing face is less than a distance between the reflective surface and the first sensing face, the distance between the reflective surface and the second sensing face is larger than or equal to a distance between the display layer and the second sensing face, and an incident light arriving at the reflective surface forms a reflected light capable of transmitting through the sensing unit and the covering unit.

According to one embodiment, the display module may further a light-emitting unit arranged between the covering unit and the display unit, configured to provide the incident light.

According to another embodiment, the light-emitting unit may comprise a light-emitting face arranged opposite to the reflective surface, and the light-emitting unit has a third light transmittance capable of allowing light to pass through in a direction of the reflected light.

According to another embodiment, the display module may further comprise a light-emitting unit configured to emit light; a uniform light unit having a fourth light transmittance, the uniform light unit being arranged between the covering unit and the display unit and configured to conduct the light emitted by the light-emitting unit, so that the light emitted by the light-emitting unit irradiates to the reflective surface to form the incident light.

According to another embodiment, the sensing unit may further comprise a light-emitting layer arranged between the first sensing face and the second sensing face, the light-emitting layer facing towards the reflective surface and configured to emit the incident light.

According to another embodiment, the first sensing face may be arranged on a first surface of the light-emitting layer, and the second sensing face is arranged on a second surface of the light-emitting layer, and wherein a plurality of non-intersect first sensing lines are arranged on the first sensing face, a plurality of non-intersect second sensing lines are arranged on the second sensing face, and sensing lines projected to the first sensing face by the second sensing lines intersect with the first sensing lines.

Another embodiment of the present disclosure provides a display module, comprising:
a covering unit satisfying a first light transmittance, comprising a touch area;
a sensing unit satisfying a second light transmittance, comprising a sensing layer, wherein the covering unit is arranged on a first side of the sensing layer, and the sensing layer is configured to sense a touch position of an operator in the touch area when the operator touches the touch area;
a reflective type display unit, comprising a display layer and a reflective surface, wherein the display unit is arranged on a second side of the sensing layer, and the display layer and the reflective surface are respectively opposite to the sensing layer; and the display unit is configured to display images through the display layer, and a distance between the reflective surface and the sensing unit is larger than or equal to a distance between the display layer and the sensing unit, wherein an incident light arriving at the reflective surface forms a reflected light capable of transmitting through the sensing unit and the covering unit.

According to another embodiment, the sensing unit may further comprise a light-emitting layer facing towards the reflective surface, configured to emit the incident light.

According to another embodiment, the sensing layer may further comprise a first sensing face and a second sensing face, and wherein the first sensing face is arranged on a first surface of the light-emitting layer, and the second sensing face is arranged on a second surface of the light-emitting layer, a plurality of non-intersect first sensing lines being arranged on the first sensing face, a plurality of non-intersect second sensing lines being arranged on the second sensing face, and sensing lines projected to the first sensing face by the second sensing lines intersecting with the first sensing lines.

Another embodiment of the present disclosure further provides an electronic device, comprising:

a covering unit satisfying a first light transmittance, including a first surface and a second surface opposite to each other;

a sensing unit satisfying a second light transmittance, including a first sensing face and a second sensing face opposite to each other, wherein the sensing unit is arranged on a side of the covering unit, and the first sensing face is opposite to the second surface, a first distance between the first sensing face and the first surface being larger than a second distance between the first sensing face and the second surface, and wherein the sensing unit is configured to sense a touch position of an operator in a touch area of the first surface of the covering unit when the operator touches the touch area;

a reflective type display unit arranged on a side of the sensing unit, the display unit comprising a display layer and a reflective surface, wherein the display unit is configured to display images on the display layer, and the display layer and the reflective surface are respectively opposite to the second sensing face, and wherein a distance between the reflective surface and the second sensing face is less than a distance between the reflective surface and the first sensing face, the distance between the reflective surface and the second sensing face is larger than or equal to a distance between the display layer and the second sensing face, and an incident light arriving at the reflective surface forms a reflected light capable of transmitting through the sensing unit and the covering unit; and a processing unit, configured to generate an operating instruction corresponding to the touch position, according to the touch position sensed by the sensing unit.

According to another embodiment, the electronic device may further comprise: a light-emitting unit, configured to provide the incident light.

According to another embodiment, the sensing unit may further comprise a light-emitting layer facing towards the reflective surface, configured to emit the incident light.

According to another embodiment, the first sensing face may be arranged on a first surface of the light-emitting layer, and the second sensing face may be arranged on a second surface of the light-emitting layer, and wherein a plurality of non-intersect first sensing lines may be arranged on the first sensing face, a plurality of non-intersect second sensing lines may be arranged on the second sensing face, and sensing lines projected to the first sensing face by the second sensing lines intersect with the first sensing lines.

According to another embodiment, the electronic device may further comprise a detection unit configured to detect a luminance value of environment light; wherein the processing unit is configured to turn off the light-emitting unit, when the luminance value of environment light is larger than or equal to a preset luminance value; and to turn on the light-emitting unit, when the luminance value of environment light is less than the preset luminance value.

According to another embodiment, the electronic device may further comprise a detection unit configured to detect a luminance value of environment light.

The processing unit may be further configured to turn off the light-emitting layer, when the luminance value of environment light is larger than or equal to a preset luminance value; and to turn on the light-emitting layer, when the luminance value of environment light is less than the preset luminance value.

Another embodiment of the present disclosure further provides a control method of an electronic device comprising a reflective type display unit and a light-emitting unit, the control method comprising:

detecting a luminance value of environment light;
determining whether the luminance value of environment light is larger than or equal to a preset luminance value;
turning off the light-emitting unit when the luminance value of environment light is larger than or equal to the preset luminance value; and turning on the light-emitting unit when the luminance value of environment light is less than the preset luminance value.

Another embodiment of the present disclosure further provides another control method of an electronic device, the electronic device comprising a covering unit satisfying a first light transmittance, a sensing unit satisfying a second light transmittance, a reflective type display unit and a light-emitting unit, wherein the covering unit comprises a touch area; the sensing unit comprises a sensing layer, wherein the covering unit is arranged on a first side of the sensing layer, and the sensing layer is configured to sense a touch position of an operator in the touch area when the operator touches the touch area; the reflective type display unit comprises a display layer and a reflective surface, wherein the display unit is arranged on a second side of the sensing layer, and the display layer and the reflective surface are respectively opposite to the sensing layer; and the display unit is configured to display images through the display layer, and a distance between the reflective surface and the sensing unit is larger than or equal to a distance between the display layer and the sensing unit, wherein an incident light arriving at the reflective surface forms a reflected light capable of transmitting through the sensing unit and the covering unit; and the light-emitting unit is configured to provide the incident light;

the control method comprising:
detecting a luminance value of environment light;
determining whether the luminance value of environment light is larger than or equal to a preset luminance value;
turning off the light-emitting unit when the luminance value of environment light is larger than or equal to the preset luminance value; and turning on the light-emitting unit when the luminance value of environment light is less than the preset luminance value.

According to some embodiments of the present invention, the reflective type display unit and the touch sensing technique may be integrated in the display module, and a front light-emitting light source may be additionally arranged over the display unit for providing irradiation light for the display unit, so as to form a novel structure of the touch display.

According to some embodiments of the present invention, the light-emitting unit may be controlled to be turned on or off by configuring the detection unit for detecting the luminance value of environment light, so as to save the power consumption of the electronic device.

DETAILED DESCRIPTION OF PREFERRED EMBODIMENTS

Hereinafter, embodiments of the present disclosure will be detailed with reference to the drawings which show examples thereof. It should be understood that these descriptions are only illustrative but do not limit the scope of the present disclosure.

According to some embodiments of the present disclosure, a reflective type screen and a touching technique may be integrated in a display module, so as to develop a novel structure of a touch type display.

According to an embodiment, the display module may include e.g.:

a covering unit satisfying a first light transmittance, including a touch area;

a sensing unit satisfying a second light transmittance, including a sensing layer, wherein the covering unit is arranged on a first side of the sensing layer, and the sensing layer is configured to sense a touch position of an operator in the touch area when the operator touches the touch area;

a reflective type display unit, including a display layer and a reflective surface, wherein the display unit is arranged on a second side of the sensing layer, and the display layer and the reflective surface are respectively opposite to the sensing layer; and the display unit is configured to display images through the display layer, wherein an incident light arriving at the reflective surface forms a reflected light capable of transmitting through the sensing unit and the covering unit.

Figure 1:
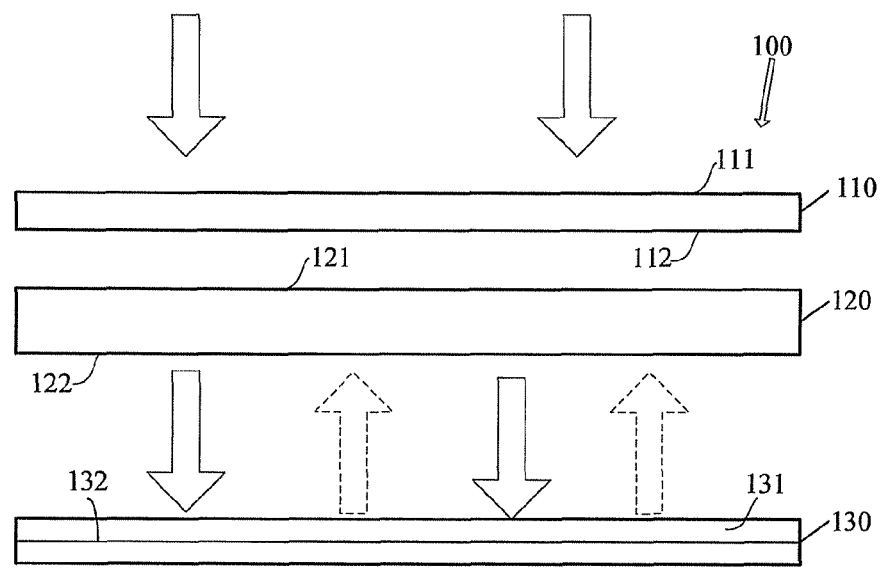
FIG. 1 is an illustrative structure diagram of a display module according to a first embodiment of the present disclosure.

FIG. 1 is an illustrative structure diagram of the display module according to the first embodiment of the present disclosure. Referring to FIG. 1, the display module 100 according to the embodiment may include a covering unit 110, a sensing unit 120 and a reflective type display unit 130.

The covering unit 110 may satisfy the first light transmittance and include a first surface 111 and a second surface 112 opposite to each other. In the present disclosure, some component "satisfying the light transmittance" means that a passing rate of light through the component reaches a certain requirement, so that the component looks substantially complete transparent or translucent satisfying a visible requirement, and materials for the component may not be color and material quality limited. Specifically, the light passing rate of the covering unit 110 satisfying the first light transmittance may at least reach the first light transmittance requirement. So the second light transmittance, the third light transmittance and the fourth light transmittance mentioned below do.

The sensing unit 120 may satisfy the second light transmittance, and include a first sensing face 121 and a second sensing face 122 opposite to each other. In the example of FIG. 1, the sensing unit 120 may be arranged on a side (lower side as shown in FIG. 1) of the covering unit 110, and the first sensing face 121 may be opposite to the second surface 112. In this case, a first distance between the first sensing face 121 and the first surface 111 may be larger than a second distance between the first sensing face 121 and the second surface 112. The sensing unit 120 may be configured to sense a touch position of an operator (e.g. a finger or a stylus pen) in a touch area of the first surface 111 of the covering unit 110 when the operator touches the touch area. It will be understood by the skilled in the art that the sensing face in the sensing unit may also be referred to as a sensing layer. Both may be interchanged in the present disclosure. For example, the first sensing face 121 and the second sensing face 122 of the sensing unit 120 in this example may also be referred to as the first sensing layer 121 and the second sensing layer 122.

The reflective type display unit 130 may be arranged at a side (lower side as shown in FIG. 1) of the sensing unit 120, and include a display layer 131 and a reflective surface 132. In the example of FIG. 1, the distance between the reflective surface 132 and the second sensing face 122 may be less than the distance between the reflective surface 132 and the first sensing face 121, and the distance between the reflective surface 132 and the second sensing face 122 may be larger than or equal to the distance between the display layer 131 and the second sensing face 122. The display unit 130 may display images through the display layer 131. When an incident light arriving at the reflective surface 132 may form a reflected light capable of transmitting through the sensing unit 120 and the covering unit 110.

In the example of FIG. 1, the covering unit 110, the sensing unit 120 and the display unit 130 are arranged from top to bottom. As will be understood by the skilled in the art, the covering unit 110, the sensing unit 120 and the display unit 130 may also form other structures such as from bottom to top, from left to right or from right to left etc.

In the display module 100 according to the first embodiment, when the environment light reaches sufficient luminance, it may pass through the covering unit 110, the sensing unit 120 and reach the reflective surface 132 to form the incident light. The incident light may be reflected by the reflective surface 132 and pass through the sensing unit 120 and the covering unit 110 sequentially to be reflected out to eyes of the user beyond the covering unit 110, so that the user may see the image displayed by the display 131. That is, the display module 100 according to the first embodiment is a reflective type display structure.

According to an example, the display screen 130 may include e.g. a reflective type display screen, wherein the reflective surface 132 may be arranged on one side of the display layer 131 (lower side as shown in FIG. 1). In this case, the distance between the reflective surface 132 and the second sensing face 122 is larger than the distance between the display layer 131 and the second sensing face 122. As shown in FIG. 1, when the display unit 130 is located under the to sensing unit 120, the reflective surface 132 is located under the display layer 131, so that the light reflected by the reflective surface 132 may pass through the display layer 131, and the user may see the image displayed by the display layer 131. The skilled in the art will understand the structure of the reflective type liquid crystal display screen, and descriptions thereof will be omitted here.

According to another example, the display unit may also include an E-ink display screen. In this type of display unit, the reflective surface may be formed on a surface of one side of the display layer facing towards the sensing unit. That is, the distance between the reflective surface and the second sensing face may be equal to the distance between the display layer and the second sensing face. The incident light reaching the reflective surface will be reflected directly upward, so that the user may see the image displayed by the display layer. The structure of the display module including this type of display unit is the same as that of the first embodiment, and the descriptions thereof will be omitted here.

According to other examples, the reflective type display unit may further include display unit of other reflection principles (such as an electrowetting display screen). The present disclosure does not limit specific types of the display unit.

Additionally, according to some embodiments, the display unit may include a display screen wholly constituted by pixel arrays, or may include one or more pixel points.

In the first embodiment of the present disclosure, the covering unit 110, the sensing unit 120 should satisfy bi-directional (incident light and reflective light) light transmittance requirement.

According to an example, the sensing unit 120 may form a resistance induction structure. For example, the sensing unit may include a multi-layer laminated film arrangement. Specifically, a layer of glass or organic glass may be provided as a substrate. A transparent first conductive layer (e.g. ITO film) may be coated on a upper surface of the substrate, and a plastic layer whose external surface is subjected to a hardening processing and is smooth proof is arranged over the substrate, a second conductive layer being formed on the internal surface of the plastic layer. Many tiny (e.g. less than 0.001 inch) transparent isolation points may be arranged between the first conductive layer and the second conductive layer. When the finger touches the covering unit 110, the first conductive layer and the second conductive layer may contact with each other, and the resistance may be varied. The variation of the resistance may be used for calculating coordinates of the touch point, and corresponding operation may be performed according to the coordinates so as to obtain an effect of the touch operation.

According to another example, the sensing unit 120 may form a capacitance induction structure. For example, the sensing unit 120 may include four-layer laminated glass screen. When the finger touches the covering unit 110, coupling capacitance may be formed between the body and the covering unit 110. For a high-frequency current, the capacitance is a direct conductor, and then the finger may take tiny current from the touch point. The current may flow out from electrodes at four corners of the touch area of the covering unit 110, and the current passing through the four electrodes may be proportional to distances between the finger and the four corners. Location information of the touch point may be obtained by calculating four current proportions, so as to perform operations related to the touch position and obtain an effect of the touch operation.

In the display module according to the above embodiment, the sensing unit and the reflective type display unit of e.g. resistance induction or capacitance induction structure may be used, so that the reflective type display screen and the single-point touch technique may be combined to form a novel structure of the touch display module.

The skilled in the art should understand the particular structure of the sensing unit 120 in either the resistance induction structure or the capacitance induction structure, and the descriptions thereof will be omitted here.

On the other hand, the sensing unit 120 may also be a multi-point touch structure, so as to allow simultaneous inputs of the user at a plurality of positions in the display screen and identify a gesture of operating the finger by the user.

Figure 2:
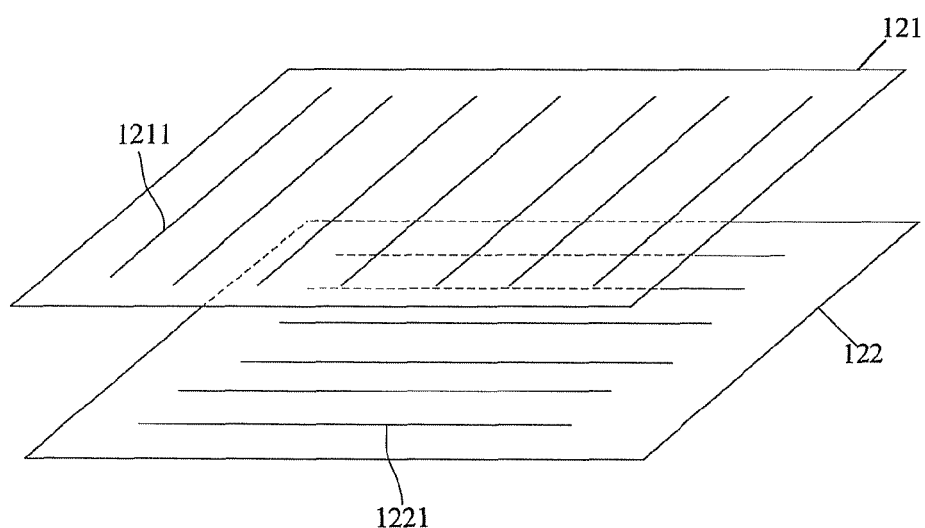
FIG. 2 is one kind of illustrative structure diagram of a sensing unit in the display module according to the first embodiment of the present disclosure.

FIG. 2 shows an illustrative structure diagram of the sensing unit 120 in the multi-point touch structure according to an embodiment. As shown in FIG. 2, a plurality of non-intersect first sensing lines 1211 may be arranged on the first sensing face 121, and a plurality of non-intersect second sensing lines 1221 may be arranged on the second sensing face 122. Sensing lines projected to the second sensing face 122 by the first sensing lines 1211 may intersect with the second sensing lines 1221, or sensing lines projected to the first sensing face 121 by the second sensing lines 1221 may intersect with the first sensing lines 1211, so that the first sensing lines 1211 and the second sensing lines 1221 may form mutual capacitance whose rows and columns may be intersected, i.e. the coupling capacitance.

With the above structure, the mutual capacitance at corresponding positions on the first sensing face 121 and the second sensing face 122 of the sensing unit 120 may be varied, when the operator touches the touch area in the first surface 111 of the covering unit 110. It may be determined that there is a touch according to the variation, and the position of each touch point may be determined.

Figure 3:
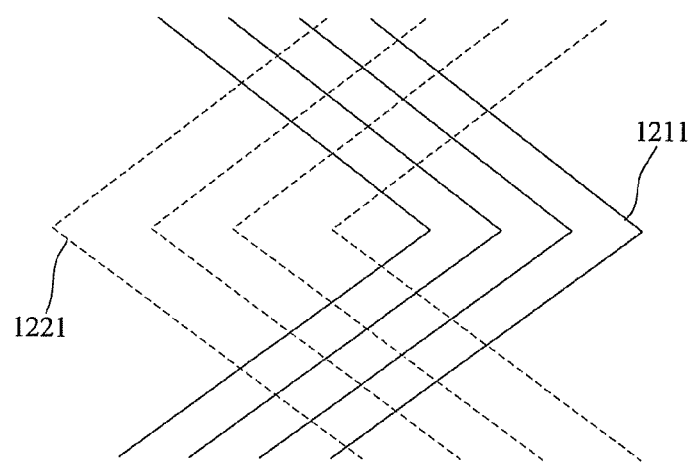
FIG. 3 is another kind of illustrative structure diagram of a sensing unit in the display module according to the first embodiment of the present disclosure.

Additionally, the first sensing line 1211 and the second sensing line 1221 are not limited to include sensing lines in parallel, respectively, but may form other arrangements. FIG. 3 shows an exemplary arrangement, in which the first sensing lines 1211 and the second sensing lines 1221 may be bended, as long as the intersection of the projected line of respective first sensing lines 1211 on the second sensing area 122 and the second sensing line 1221 respectively or the intersection of the projected line of respective second sensing lines 1221 on the first sensing area 121 and the first sensing line 1211 respectively may be guaranteed.

Therefore, in the display module according to the above embodiment, the reflective type display screen and the multi-point touch technique may be combined to form a novel structure of the touch display module.

According to another embodiment of the present disclosure, the display module may further include a light-emitting unit for providing the incident light for the reflective type display unit.

Figure 4:
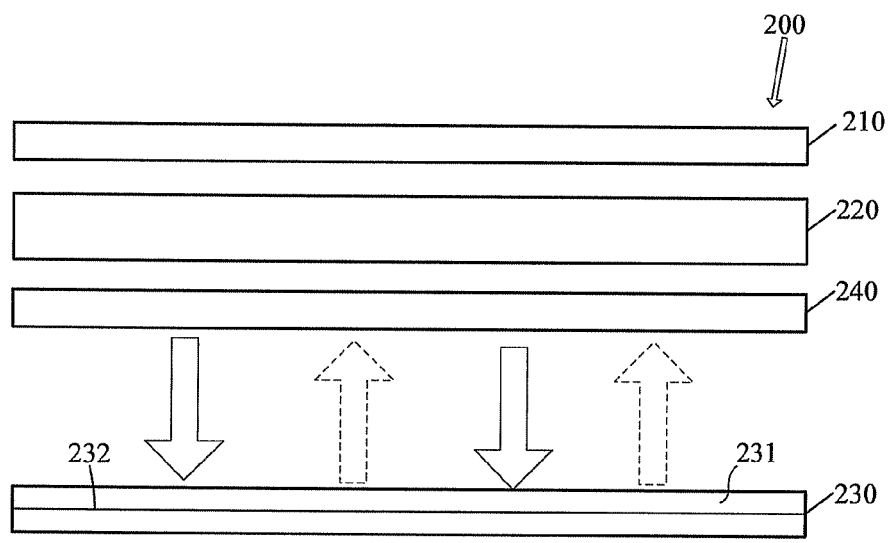
FIG. 4 is an illustrative structure diagram of a display module according to a second embodiment of the present disclosure.

FIG. 4 shows an illustrative structure diagram of the display module according to the second embodiment of the present disclosure. Referring to FIG. 4, the display module 200 according to the second embodiment may include the covering unit 210 having the first light transmittance, the sensing unit 220 satisfying the second light transmittance, the reflective type display unit 120 and the light-emitting unit 240.

Here, the arrangements of the covering unit 210, the sensing unit 220 and the reflective type display unit 230 may be the same as those of the covering unit 110, the sensing unit 120 and the reflective type display unit 130 in the display module 100 according to the first embodiment.

The light-emitting unit 240 may be arranged between the sensing unit 220 and the reflective type display unit 230, the light-emitting face of the light-emitting unit 240 being arranged opposite to the display layer 231 of the display unit 230. The light-emitting unit 240 may have the third light transmittance capable of allowing light to pass through in a direction of the reflected light, while the sensing unit 220 may at least allow light to pass through in the direction of the reflected light, so that the reflected light after being reflected on the reflective surface 232 may pass through the light-emitting 240, the sensing unit 220 and the covering unit 210, and then be transmitted to the eyes of the user beyond the covering unit 210, so that the user may see the image displayed on the display layer 231.

Similarly, the light-emitting unit 240 may also be arranged between the covering unit 210 and the sensing unit 220.

Figure 5:
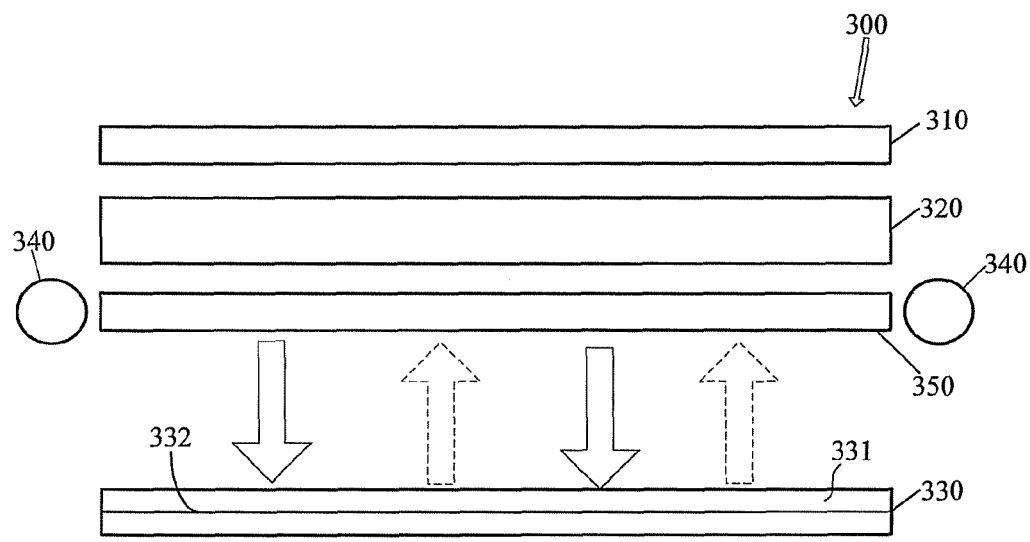
FIG. 5 is an illustrative structure diagram of a display module according to a third embodiment of the present disclosure.

FIG. 5 shows an illustrative structure diagram of the display module 300 according to the third embodiment of the present disclosure.

Similar with the first and the second embodiments, the display module 300 according to the present embodiment may include the covering unit 310, the sensing unit 320 and the reflective type display unit 330. The arrangements of the three units may be the same as those of the covering unit, the sensing unit and the reflective type display unit in the first and the second embodiments, and the descriptions thereof will be omitted here.

As shown in FIG. 5, the display module 300 may further include the light-emitting unit 340 and a uniform light unit 350. The light-emitting unit 340 may emit the light as the incident light of the display unit 330. The uniform light unit 350 may be arranged between the display unit 330 and the sensing unit 320 and have a fourth light transmittance capable of allowing the light to pass through in the direction of the reflected light. The light-emitting unit 340 may be arranged at either of or both sides of the uniform light unit 350. The uniform light unit 350 may be used for uniformly conducting the light emitted by the light-emitting unit 340, so that the light emitted by the light-emitting unit 340 may uniformly irradiate to the reflective surface 232 to form the incident light.

The reflective light reflected by the reflective surface 332 may pass through the uniform light unit 350, the sensing unit 320 and the covering unit 310 to outside, so that the user may see the image displayed by the display layer 331.

The light-emitting unit 340 may be integrated in the display module 300, and may also be arranged with the display module 300 independently.

Figure 6:
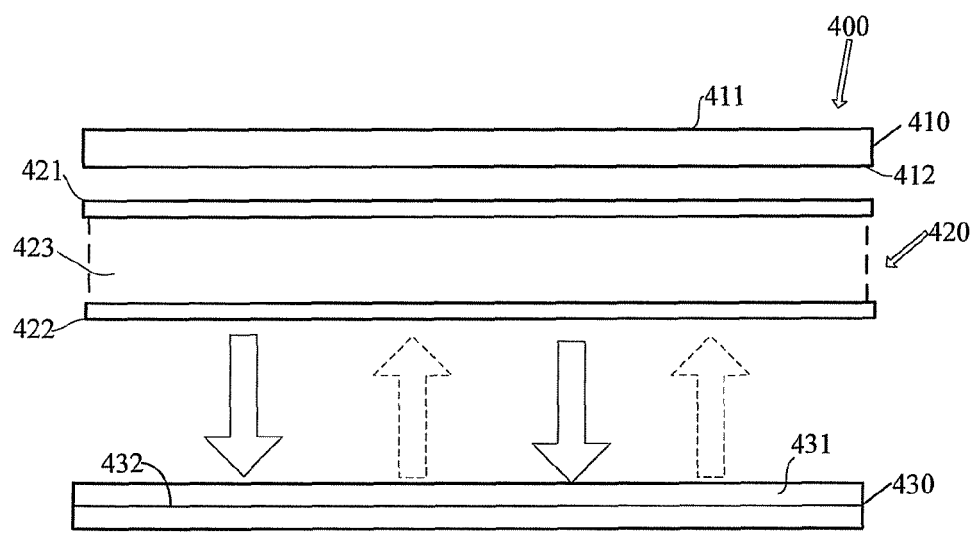
FIG. 6 is an illustrative structure diagram of a display module according to a fourth embodiment of the present disclosure.

FIG. 6 shows an illustrative structure diagram of the display module 400 according to the fourth embodiment of the present disclosure.

As shown in FIG. 6, the display module 400 according to the embodiment may include the covering unit 410, the sensing unit 420 and the reflective type display unit 430 arranged sequentially.

The covering unit 410 may satisfy the first light transmittance, and include the first surface 411 and the second surface 412 opposite to each other.

The sensing unit 420 may satisfy the second light transmittance, and include the first sensing face 421 and the second sensing face 422 opposite to each other. In the example of FIG. 4, the sensing unit 420 may be arranged on one side (lower side as shown in FIG. 6) of the covering unit 410, and the first sensing face 421 is opposite to the second surface 412. In this case, the first distance between the first sensing face 421 and the first surface 411 is larger than the second distance between the first sensing face 421 and the second surface 412. The sensing unit 420 may be configured to sense the touch position of the operator (e.g. the finger or the stylus pen) in the touch area of the first surface 411 of the covering unit 410 when the operator touches the touch area.

The reflective type display unit 430 may be arranged on one side (lower side as shown in FIG. 6) of the sensing unit 420, and include the display layer 431 and the reflective surface 432, the display layer 431 and the reflective surface 431 being opposite to the second sensing face 422 respectively. In the example of FIG. 6, the distance between the display layer 431 and the second sensing face 422 is less than the distance between the display layer 431 and the first sensing face 421. The display unit 430 may display images through the display layer 431. The incident light arriving at the reflective surface 431 may form the reflected light capable of transmitting through the sensing unit 420 and the covering unit 410.

Therefore, same as the first to the third embodiments, the covering unit 410, the sensing unit 420 and the display unit 430 in the fourth embodiment form a structure arranged sequentially from the top to bottom.

Additionally, in the fourth embodiment as shown in FIG. 6, the sensing unit 420 may include a light-emitting layer 423 arranged between the first sensing face 421 and the second sensing face 422. The light-emitting layer 423 may face towards the display layer 431 and may be used for providing the incident light.

For example, the light-emitting layer 412 may include an organic light emitting diode (OLED) satisfying the second light transmittance (i.e. looks substantially complete transparent or translucent satisfying a visible requirement). On one hand, the light emitted from the OLED has a good uni-directionality, so as to effectively emit light towards the reflective surface 432; on the other hand, the OLED may have a high transmittance characteristic in an opposite direction of emitting light, so that the reflected light reflected from the reflective surface 432 may pass through the OLED (i.e. the light-emitting layer) to be transmitted upward to the covering unit 410.

According to an example, capacitive medium may be covered on the first surface of basic glass of the light-emitting layer 423 (such as the OLED light-emitting layer) to form the first sensing face 421. The capacitive medium may be covered on the second surface opposite to the first surface on the basic glass of the light-emitting layer 423 (such as the OLED light-emitting layer) to form the second sensing face 422. The sensing unit 420 may utilize the first sensing face 421 and the second sensing face 422 to constitute the multi-point touch sensing structure.

The skilled in the art should understand the structure of the transparent OLED, and should understand the particular manufacture process and the implementation of the OLED whose upper and lower surfaces integrate the multi-point touch sensing structure, and the descriptions thereof will be omitted here.

Therefore, in the display module 400 according to the fourth embodiment, e.g. the transparent OLED may be used as front irradiating light of the display unit 430, and may be integrated with the multi-point touch sensing structure as a whole, so as to form the novel structure of the touch display, and to achieve the purpose of reducing thickness of the whole module and saving the manufacture process and cost.

The particular structures of the first sensing face 421 and the second sensing face 422 which form the multi-point touch sensing structure may refer to the above descriptions on the multi-point touch sensing in connection with FIGS. 2 and 3, and the descriptions thereof will be omitted here.

As described above, in the display module according to the embodiment of the present disclosure, the reflective type display module and the touch technique may be integrated, and the front irradiating light source may also be arranged opposite to the reflective type display panel, so as to constitute the novel structure of the reflective type touch display.

Figure 7:
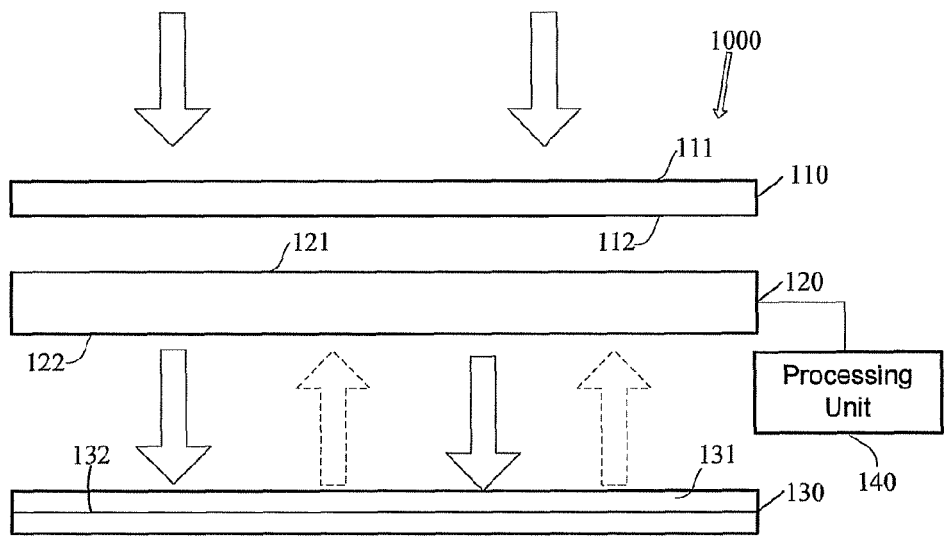
FIG. 7 is an illustrative structure diagram of related parts of an electronic device according to an embodiment of the present disclosure.

FIG. 7 is an illustrative structure diagram of related parts of the electronic device 1000 according to an embodiment of the present disclosure. As shown in FIG. 7, the electronic device 1000 according to the present embodiment may include the covering unit 110, the sensing unit 120, the reflective type display unit 130 and the processing unit 140.

The covering unit 110 may satisfy the first light transmittance and include the first surface 111 and the second surface 112 opposite to each other.

The sensing unit 120 may satisfy the second light transmittance, and include the first sensing face 121 and the second sensing face 122 opposite to each other. In the example of FIG. 7, the sensing unit 120 may be arranged on one side (lower side as shown in FIG. 7) of the covering unit 110, and the first sensing face 121 is opposite to the second surface 112. In this case, the first distance between the first sensing face 121 and the first surface 111 is larger than the second distance between the first sensing face 121 and the second surface 112. The sensing unit 120 may be configured to sense the touch position of the operator in the touch area of the first surface 111 of the covering unit 110 when the operator touches the touch area;

The reflective type display unit 130 may be arranged on one side (lower side as shown in FIG. 7) of the sensing unit, and may include a display layer 131 and a reflective surface 132, wherein the display unit 131 and the reflective surface 132 are respectively opposite to the second sensing face 122. In the example of FIG. 7, the distance between the reflective surface 132 and the second sensing face 122 is less than the distance between the reflective surface 132 and the first sensing face 121. The display unit 130 may display images on the display layer 131. The incident light arriving at the reflective surface 132 forms the reflected light capable of transmitting through the sensing unit 120 and the covering unit 110.

The processing unit 140 may be configured to generate an operating instruction corresponding to the touch position, according to the touch position sensed by the sensing unit 120.

In the present embodiment, the covering unit 110, the sensing unit 120 and the display unit 130 may form the display module 100 as shown in FIG. 1. Particularly, the display unit 130 in the display module may include a liquid crystal display screen.

According to another example, the display unit may also include an E-ink display screen. In this type of display unit, the reflective surface may be formed on a surface of one side of the display layer facing towards the sensing unit. In the case where this kind of display unit is used, the arrangement of the display unit relative to the covering unit and the sensing unit may be the case as shown in FIG. 7, and the descriptions thereof will be omitted here.

According to the embodiment of the present disclosure, the sensing unit 120 may be formed in the resistance induction type, the capacitance induction type, or the multi-point touch induction type. The descriptions thereof may refer to the above descriptions on the first embodiment, and will be omitted here.

According to other embodiments, the display module in the electronic device may also include the display module according to other embodiments of the present disclosure, e.g. any one of the display modules as shown in FIGS. 4-6.

When the display module is implemented as the form shown in FIG. 4 or 5, the display module may further include the light-emitting unit for providing the incident light for the display unit. In this case, the electronic device may further include a detection unit for detecting a luminance value of the environment light, and determining whether the luminance value of the environment light is larger than or equal to a preset luminance value. The processing unit 140 may be further configured to turn off the light-emitting unit, when the luminance value of environment light is larger than or equal to the preset luminance value; and to turn on the light-emitting unit, when the luminance value of environment light is less than the preset luminance value.

Figure 8:
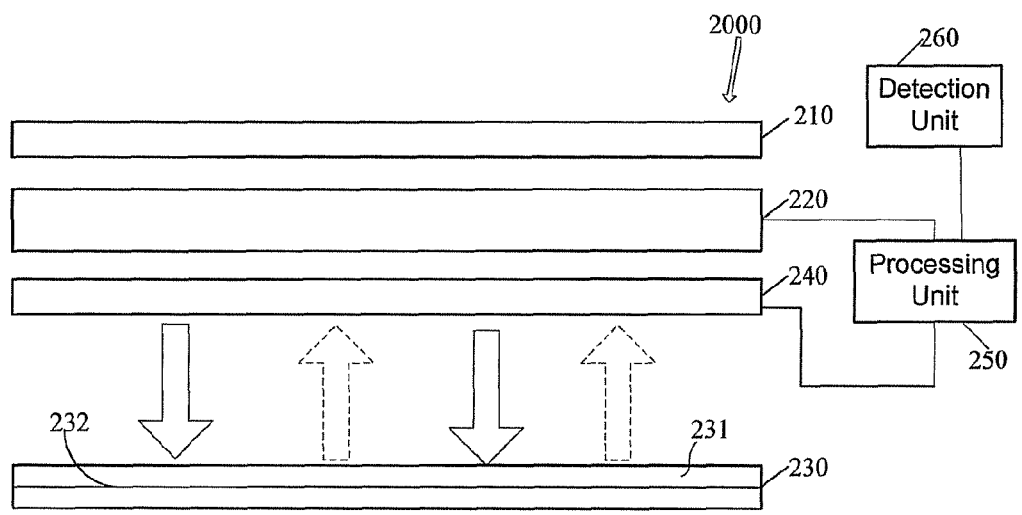
FIG. 8 is an illustrative structure diagram of related parts of an electronic device according to another embodiment of the present disclosure.

FIG. 8 is an illustrative structure diagram of related parts of the electronic device according to another embodiment of the present disclosure. The electronic device 2000 according to the present embodiment may include the display module 200, the processing unit 250 and the detection unit 260 of the second embodiment.

As described above, the display module 200 may include the covering unit 210, the sensing unit 220, the reflective type display unit 230 and the light-emitting unit 240. The arrangement of the display module 200 may refer to the description on the second embodiment as mentioned above, and the descriptions thereof will be omitted here.

The processing unit 250 may be configured to generate the operating instruction corresponding to the touch position, according to the touch position sensed by the sensing unit 220.

The detection unit 260 may be configured to detect the luminance value of the environment light, and may determine whether the luminance value of the environment light is larger than or equal to a preset luminance value. According to an example, the preset luminance value may be set to a minimum luminance value enabling the user to clearly see the image displayed by the display unit 230.

When the detection unit 260 determines that the luminance value of the environment light is less than the preset luminance value, i.e. the environment light cannot provide light of enough luminance so that the user may clearly see the image displayed by the display layer 231, the processing unit 250 may turn on the light-emitting unit 240 according to the determination result of the detection unit 260. The light-emitting unit 240 may irradiate the reflective surface 232 for providing the incident light to the display unit 230. At this time, the light-emitting unit 240 has the third light transmittance capable of allowing the light to pass through in the direction of the reflected light, and the sensing unit 220 may also allow the light to pass through in the direction of the reflected light, so that the reflected light may pass through the light-emitting unit 240, the sensing unit 220 and the covering unit 210 and be transmitted to the eyes of the user beyond the covering unit 210.

When the detection unit 260 determines that the luminance value of the environment light is larger than or equal to the preset luminance value, i.e. the environment light can provide light of enough luminance so that the user may clearly see the image displayed by the display layer 231, the processing unit 250 may turn off the light-emitting unit 240 the processing unit 250 may turn off the light-emitting unit 240 according to the determination result of the detection unit 260. The environment light may provide the incident light to the display unit 230. At this time, the light-emitting unit 240 and the sensing unit 220 should not only allow the light to pass through in the direction of the reflected light, but allow the light to pass through in the direction of the incident light, so that the environment light may pass through the covering unit 210, the sensing unit 220 to arrive at the reflective surface 232 to form the incident light. The incident light may be then reflected by the display layer 231, and pass through the sensing unit 220 and the covering unit 210 sequentially and be reflected outside to the eyes of the user beyond the covering unit 210.

It should be noted that in the above embodiments, the detection unit 260 determines whether the luminance value of the environment light is larger than or equal to the preset luminance value. However, the present disclosure is not limited to this. For example, the determination operation may be performed by the processing unit 250, and the detection unit 260 may be configured to detect the luminance of the environment light and input the detected luminance of the environment light to the processing unit 250.

Similarly, the electronic device may also use the display module of the third embodiment in connection with FIG. 5. In this case, the detection unit for detecting the luminance value of the environment light may also be configured, so that the processing unit may control to turn on/off the light-emitting unit according to the detection result of the detection unit.

According to the above embodiment, the luminance value of the environment light may be detected by configuring the detection unit, so as to control the turning on/off of the light-emitting unit for saving the power consumption of the electronic device.

Similarly, the electronic device may also use the display module of the fourth embodiment in connection with FIG. 6. In this display module, the light-emitting layer such as the OLED light-emitting layer may be arranged between the first sensing face and the second sensing face of the sensing unit.

According to the present embodiment, the capacitive medium may be covered on the first surface of basic glass of the light-emitting layer (such as the OLED light-emitting layer) to form the first sensing face. The capacitive medium may be covered on the second surface opposite to the first surface on the basic glass of the light-emitting layer (such as the OLED light-emitting layer) to form the second sensing face. The sensing unit may utilize the first sensing face and the second sensing face to constitute the multi-point touch sensing structure.

The particular arrangement of the display module may refer to e.g. the descriptions of the fourth embodiment, and the descriptions thereof will be omitted here.

According to one embodiment of the present disclosure, a control method of an electronic device may be provided. The electronic device may include the reflective type display unit and the light-emitting unit, wherein the light-emitting unit is configured to emit light to the display layer of the display unit. The display unit may include a display layer for displaying images. The display layer of the display unit may receive the incident light emitted by the light-emitting unit, and reflect the incident light to the eyes of the user beyond the display layer, so that the user may see the image displayed by the display layer.

Particularly, the control method may include: detecting the luminance value of the environment light; determining whether the luminance value of the environment light is larger than or equal to a preset luminance value; turning off the light-emitting unit when the luminance value of environment light is larger than or equal to the preset luminance value; and turning on the light-emitting unit when the luminance value of environment light is less than the preset luminance value.

According to another embodiment of the present disclosure, a control method of an electronic device may be provided. The electronic device may include a covering unit satisfying a first light transmittance, a sensing unit satisfying a second light transmittance, a reflective type display unit and a light-emitting unit. The covering unit may include a touch area. The sensing unit may include a sensing layer, wherein the covering unit is arranged on a first side of the sensing layer. The sensing layer may be configured to sense a touch position of an operator in the touch area when the operator touches the touch area. The reflective type display unit may include a display layer and a reflective surface. The display unit may be arranged on a second side of the sensing layer, and the display layer and the reflective surface are respectively opposite to the sensing layer. The display unit may display images through the display layer. An incident light arriving at the reflective surface may form a reflected light capable of transmitting through the sensing unit and the covering unit. The light-emitting unit may be configured to provide the incident light;

The display module in the electronic device may be the display modules as described in connection with FIGS. 1, 4 and 6. The descriptions of particular arrangements of the display modules may refer to those as discussed above, and descriptions thereof will be omitted here.

Particularly, the control method may include: detecting a luminance value of environment light; determining whether the luminance value of environment light is larger than or equal to a preset luminance value; turning off the light-emitting unit when the luminance value of environment light is larger than or equal to the preset luminance value; and turning on the light-emitting unit when the luminance value of environment light is less than the preset luminance value.

According to the above method, the turning on/off of the light-emitting unit may be controlled by detecting the luminance value of the environment light, so as to save the power consumption of the electronic device.

According to some embodiments of the present disclosure, the reflective type display unit and the touch sensing technique may be integrated in the display module, and a front light-emitting light source may be additionally arranged over the display unit for providing irradiation light for the display unit, so as to provide the novel structure of the touch display.

According to some embodiments of the present disclosure, the sensing unit and the light-emitting layer may be arranged in combination, so as to reduce the thickness of the whole module and to save the manufacture process and cost.

According to some embodiments of the present disclosure, the detection unit may be configured for detecting the luminance value of the environment light so as to control the turning on/off of the light-emitting unit for saving the power consumption of the electronic device.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

What is claimed is:

1. A display module, comprising:
   a covering unit satisfying a first light transmittance, comprising a touch area;
   a sensing unit satisfying a second light transmittance, comprising a sensing layer, wherein the covering unit is arranged on a first side of the sensing layer, and the sensing layer is configured to sense a touch position of an operator in the touch area when the operator touches the touch area;
   a reflective type display unit, comprising a display layer and a reflective surface, wherein the display unit is arranged on a second side of the sensing layer, and the display layer and the reflective surface are respectively opposite to the sensing layer; and the display unit is configured to display images through the display layer, and a distance between the reflective surface and the sensing unit is larger than or equal to a distance between the display layer and the sensing unit, wherein an incident light arriving at the reflective surface forms a reflected light capable of transmitting through the sensing unit and the covering unit, wherein the sensing unit further comprises a light-emitting layer facing towards the reflective surface, configured to emit the incident light, wherein the sensing layer comprises a first sensing face and a second sensing face, and wherein the first sensing face is arranged on a first surface of the light-emitting layer, and the second sensing face is arranged on a second surface of the light emitting layer, a plurality of non-intersect first sensing lines being arranged on the first sensing face, a plurality of non-intersect second sensing lines being on the second sensing face, and sensing lines projected to the first sensing face by the second sensing lines intersecting with the first sensing lines.

2. A control method of an electronic device, the electronic device comprising a covering unit satisfying a first light transmittance, a sensing unit satisfying a second light transmittance, a reflective type display unit and a light-emitting unit, wherein the covering unit comprises a touch area; the sensing unit comprises a sensing layer, wherein the covering unit is arranged on a first side of the sensing layer, and the sensing layer is configured to sense a touch position of an operator in the touch area when the operator touches the touch area; the reflective type display unit comprises a display layer and a reflective surface, wherein the display unit is arranged on a second side of the sensing layer, and the display layer and the reflective surface are respectively opposite to the sensing layer; and the display unit is configured to display images through the display layer, and a distance between the reflective surface and the sensing unit is larger than or equal to a distance between the display layer and the sensing unit, wherein an incident light arriving at the reflective surface forms a reflected light capable of transmitting through the sensing unit and the covering unit; and the light-emitting unit is configured to provide the incident light, wherein the sensing unit further comprises a light-emitting layer facing towards the reflective surface, configured to emit the incident light, wherein the sensing layer comprises a first sensing face and a second sensing face, and wherein the first sensing face is arranged on a first surface of the light-emitting layer, and the second sensing face is arranged on a second surface of the light-emitting layer, a plurality of non-intersect first sensing lines being arranged on the first sensing face, a plurality of non-intersect second sensing lines being arranged on the second sensing face, and sensing lines projected to the first sensing face by the second sensing lines intersecting with the first sensing lines;

the control method comprising:
- detecting a luminance value of environment light;
- determining whether the luminance value of environment light is larger than or equal to a preset luminance value;
- turning off the light-emitting unit when the luminance value of environment light is larger than or equal to the preset luminance value; and turning on the light-emitting unit when the luminance value of environment light is less than the preset luminance value.

* * * * *